No. 885,142. PATENTED APR. 21, 1908.
F. A. BROWNELL.
PHOTOGRAPHIC CAMERA SHUTTER.
APPLICATION FILED AUG. 3, 1904.
2 SHEETS—SHEET 1.
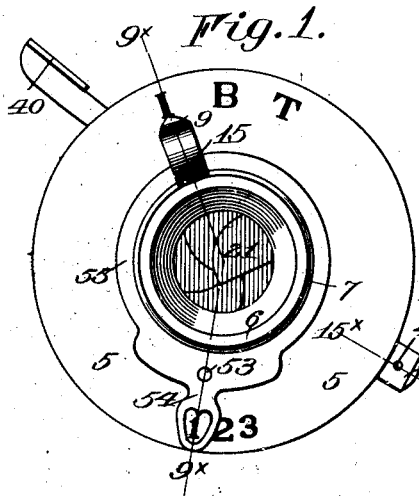
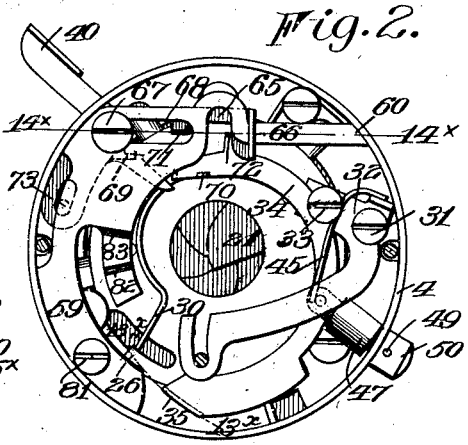
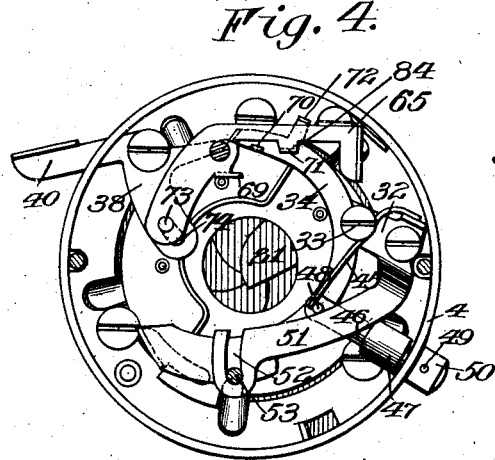
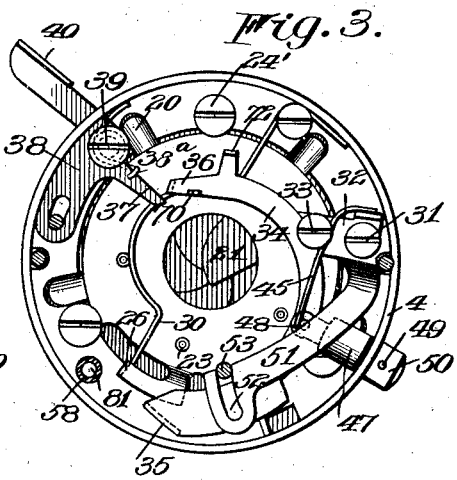
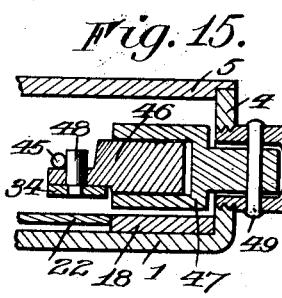
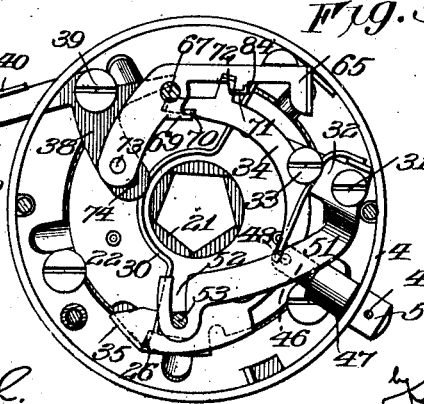
Witnesses
Inventor
Frank A. Brownell
his Attorney No. 885,142. PATENTED APR. 21, 1908.
F. A. BROWNELL.
PHOTOGRAPHIC CAMERA SHUTTER.
APPLICATION FILED AUG. 3, 1904.
2 SHEETS—SHEET 2.
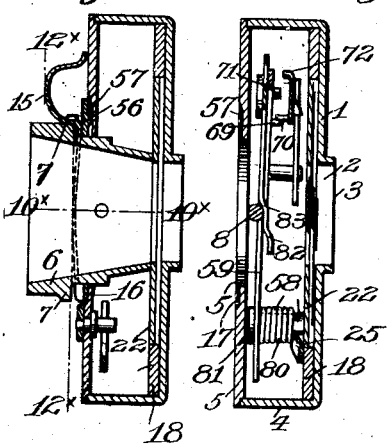
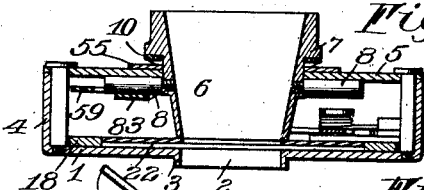
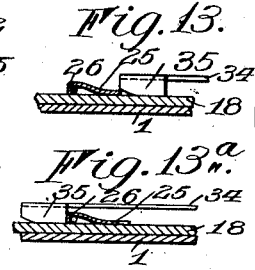
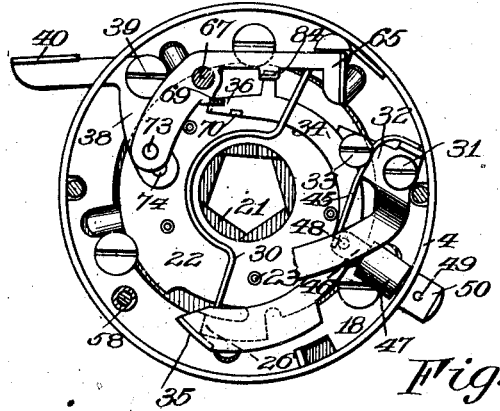
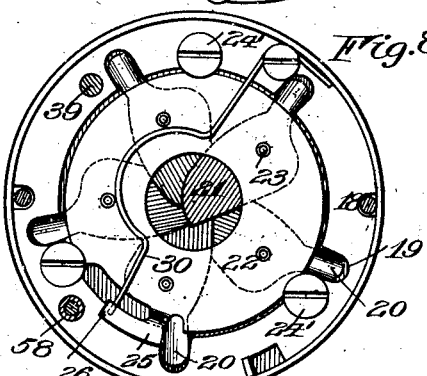
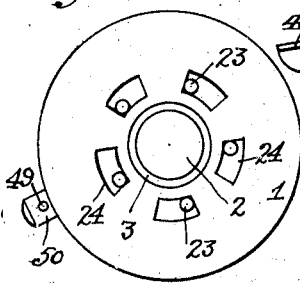
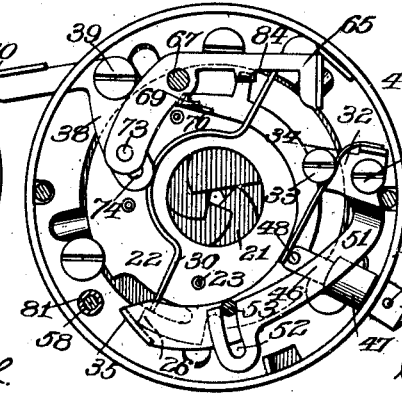
Witnesses
Inventor
Frank A. Brownell
Attorney

UNITED STATES PATENT OFFICE.

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-CAMERA SHUTTER.

No. 885,142.     Specification of Letters Patent.     Patented April 21, 1908.

Application filed August 3, 1904. Serial No. 219,287.

*To all whom it may concern:*

Be it known that I, FRANK A. BROWNELL, of Rochester, in the county of Monroe and State of New York, have invented certain new and useful Improvements in Photographic-Camera Shutters; and I do hereby declare the following to be a full, clear, and exact description of the same, reference being had to the accompanying drawings, forming a part of this specification, and to the reference-numerals marked thereon.

My present invention relates to shutters for photographic cameras, and particularly to that class known as iris diaphragm shutters, embodying a plurality of pivoted overlapping leaves or blades, and it has for its object to provide a suitable operating mechanism therefor whereby the leaves may be operated for making either time, bulb or instantaneous exposures, and also for governing the relative movement of the leaves so that the opening formed upon any of the above mentioned exposures may be stopped or varied in size as the operator may desire.

To these and other ends the invention consists in certain improvements and combinations of parts, all as will be hereinafter more fully described, the novel features being pointed out in the claims at the end of the specification.

In the drawings:—Figure 1 is a front elevation of a camera shutter embodying my invention. Fig. 2 is a similar view thereof with the cover or front of the casing removed, showing the parts in a normal position. Fig. 3 is also a front elevation showing, in detail the master member, the actuating device therefor and the adjustable arm supporting it. Fig. 4 is a view showing the master member in actuated position and the time and bulb stops adapted to coöperate therewith, the support for said stops being omitted to more clearly illustrate the underlying parts. Fig. 5 is a view similar to Fig. 4 showing the master member in the position in which it is temporarily arrested by the bulb stop. Fig. 6 is a view corresponding to Figs. 4 and 5 showing the master member arrested by the time stop, and Fig. 7 is a view showing the parts in the same position as Fig. 6, and in conjunction therewith illustrating the effect of the adjustment of the master member whereby the aperture formed by the opening movement of the shutter blades may be varied. Fig. 8 is a view taken within the casing and illustrating the pivoted shutter blades and a member for operating them. Fig. 9 is a cross sectional view on the line 9× 9× of Fig. 1, the mechanism within the shutter casing being omitted, and Fig. 10 is a cross sectional view taken on the line 10× 10× of Fig. 9. Fig. 11 is a cross sectional view similar to Fig. 9 illustrating the adjustment of the stop supporting member whereby the time and bulb stops are moved into operative position relative the master member. Fig. 12 is a sectional view taken on the line 12× 12× of Fig. 9. Fig. 13 is a detail sectional view on the line 13× 13× of Fig. 2 showing the parts in a normal position, and Fig. 13ª is a similar view showing the parts in operative position. Fig. 14 is a cross sectional view on the line 14× 14× of Fig. 2. Fig. 15 is a sectional view on the line 15× 15× of Fig. 1 showing the retarding device. Fig. 16 is a rear view of the shutter casing.

Similar reference numerals in the several figures indicate similar parts.

A camera shutter embodying my invention is arranged within a circular casing embodying the bottom 1 provided with a central aperture 2 surrounded by a short rearwardly extending annular rim 3. The flange 4 facing the top of the casing is preferably formed integrally with the bottom 1 by being stamped or otherwise turned upwardly thereon and is adapted to receive a cover or closure 5 provided with a central aperture, in alinement with the aperture 2, in which is journaled a sleeve 6 provided on its outer side with a shoulder 7 and held in position on the cover by means of diametrically arranged posts or screws 8. The adjustment of the time and bulb stops whereby either instantaneous bulb or time exposures may be made by the shutter, as will be more fully described, are accomplished by the rotation of the sleeve 6, and to this end it is provided with an index finger 9 mounted on a ring 10 encircling the sleeve, said ring being secured thereto by means of the offset 15, in the finger, which extends through a notch formed in the shoulder 7. The ring 10 is also provided with a small projection 16 adapted to engage one of a series of notches 17 formed in the face of the cover 5, whereby the sleeve may be held whenever it is adjusted to move the index finger into engagement with one or the other of the letters I, B, T (as shown in Fig. 1) to set the shutter for making either of the aforementioned exposures.

On the bottom 1 of the casing is a stationary ring 18 provided with a plurality of notches 19 the sides of which form shoulders between which loosely rest the ends 20 of the shutter blades 21. The outer ends of the blades are curved slightly at the edges to increase the thickness of the blades at their bearing points while their thin inner ends overlap to normally close the aperture 2. Arranged within the ring 18 but preferably not engaging therewith, is an operating or controlling member 22 carrying pins 23 extending through each of the leaves and entering slots or apertures 24 located in the bottom 1 forming a support, as shown in Fig. 16. These slots have the inner concentric surfaces against which the pins 23 rest to center the ring or operating member 22 and as they extend through the leaves the latter will be rotated upon their pivots, to open or close the lens aperture when the ring or controlling member is turned in one direction or the other. If desired the length of slots 24 may be proportioned to limit the opening movement of the blades. The member 22 is held in position within the ring 18 by the heads of screws 24', and at one side it is provided with a shoulder 25, extending over the ring 18 and having an end or abutment 26 with which a master member is adapted to engage as will be further described. The member is normally operated by a spring 30, in a direction to move the leaves so that the shutter aperture is closed, as shown particularly in Fig. 8. Pivoted upon a screw or stud 31 is an arm 32, carrying a stud 33, on which is pivoted a semi-circular master member 34, provided with a lip or shoulder 35, adapted to coöperate with the abutment 25, on the member 22. At its opposite end the master member is provided, upon its rear side, with a small latch projection 36 with which coöperates the end 37 of a pivoted actuating device 38, journaled upon a screw or stud 39, having the operating end or finger piece 40 projecting exteriorly of the casing, which is normally operated in one direction by a coil spring wrapped around the stud 39 and having the end 38ª engaging said actuating device. The master member is normally operated into the position, shown in Figs. 2, 3 and 6 by means of a spring 45, and connected to the member is a retarding device, embodying a piston 46 operating in the cylinder 47, one of said parts being pivotally connected to the master member, by a pin 48, while the other is journaled, on a pin 49, in an extension 50 on the side 4 of the casing, whereby a relative oscillatory movement of the retarding device is permitted during the operation of the master member. The desirability of a retarding device in a shutter of this kind will be apparent when it is taken into consideration that in order to insure a proper operation of the parts, it is desirable to make the motor spring 45 of sufficient strength to operate the shutter under all conditions and to afford a positive opening of the blades against the tension of the spring 30 when operated for bulb and time exposures. Owing to the minuteness of the parts and their light weight, such a spring is liable to cause too rapid an operation of the blades when the parts of the shutter are set for making the so-called instantaneous exposures, consequently it has been found desirable to regulate the speed of shutters designed to be sold in the open market and used by the public at large by the retarding device so that instantaneous exposures under ordinary conditions of light will not produce underexposed negatives.

As the shutter blades are operated by the oscillatory movement of the member 22 it will be seen that the size of the lens aperture may be regulated by determining such movement, which may be readily accomplished by varying the relative position of the master member thereto so that the dwell, or the length of time the shoulder 35 thereof remains in engagement with the abutment 26 may be regulated. This result, in the present instance is attained by an adjustment of the arm 32 carrying the pivot point 33, said arm being provided with an operating end 51, having a slot 52 at its extremity, adapted to receive a pin 53 carried on an index finger 54 arranged on the exterior of the cover 5. This finger is provided with a ring 55, similar to the ring 10, which surrounds the sleeve 6. One side of this ring is also provided with a point or depression 56 adapted to engage with a series of notches 57 arranged on the cover 5 to center the finger 54, when it registers with one or another of the numeral indications, as shown in Fig. 1, which are employed to designate the size of the lens aperture formed by the opening movement of the blades.

From an inspection of the drawings it will be noticed that the swinging movement of the master member, on its pivot 33, causes the shoulder 35 thereon to be operated at an angle across the path described by the abutment 26, during the oscillatory movement of the member 22, so that when the arm 32 is adjusted to the position shown in Fig. 2, when the finger 54 registers with the index numeral 1, and the master member is operated to the position shown in Fig. 4, the member 22 will be rotated a sufficient distance to move the blades so as to expose full size shutter opening. However, if the finger 54 is moved, from the position in Fig. 1, to register with the numeral 3 the pin 53, operating in the slot 52, will move the end 51, of the arm 32, downwardly to the position shown in Fig. 3, carrying the pivot 33 of the master member downwardly, to cause the shoulder 35 of the latter to engage the abutment 26 nearer its outer edge so that, as the member 22 is rotated, the abutment and shoulder will be disengaged when the leaves have been moved to only partially open the aperture, as shown in Fig. 7. The shoulder 35 is made of such a length that after its operating end has passed out of engagement with the abutment 26, it will, if arrested, prevent the return movement of the member 22, under the action of its spring 30, and prevent the closing of the shutter aperture as shown in Figs. 5, 6 and 7, permitting the shutter to be operated for making bulb and time exposures as will be further described.

Mounted upon a stud 58 is an arm or support 59 having an outer end 60, forming a guide on which is carried a reciprocatory member 65, held in position thereon by a loop 66 passing over the arm 60 and a headed stud 67 operating through an elongated aperture 68 in said arm. The member 65 is provided with a bulb stop 69 adapted to coöperate with a projection 70, on the master member, and it also has a time stop 71 coöperating with a projection 72, on the master member. The member 65 also carries a pin 73 which extends into an elongated aperture 74 formed in an arm of the actuating member 38 as shown in Figs. 2, 3 and 4. The projections 70 and 72 extend outwardly from the master member and are of different heights, the former being slightly longer than the latter, as shown in Fig. 11, so that they only engage with their respective bulb and time stops when these are adjusted transversely of the path of their movement and are in operative alinement therewith. The stud 58 is surrounded by a spring 80 which bears against the lower side of the arm or support 59 and the latter is primarily adjusted by means of a screw 81 and is normally moved outwardly by the spring 80 to hold the stop projections on the reciprocatory member 65 out of operative position with the projection on the master member. The arm 59 is also provided with a cam having steps 82 and 83 with which one of the pins 8 on the sleeve 6 coöperates, whereby as the latter is rotated to the position shown in Fig. 1, with the index finger 9 registering with the letter I, the arm 59 will be released, and when the sleeve is rotated to make a bulb exposure, the pin 8 engaging the step 82 will move the arm inwardly sufficiently to cause the projection 69 to be held in the plane of operation of the projection 70. If it is desired to make a time exposure the sleeve is rotated to cause the pin 8 to engage the cam step 83 and move the time stop 71 into operative alinement with the projection 72 on the master member, as shown in Fig. 11.
To make a bulb exposure the operator first adjusts the sleeve 6, as before described, so that the guide 60 supports the reciprocatory member 65 in position to carry its projection 69 into the path of the projection 70, when the master member is released, as shown in Fig. 5, in which position it will be held and the movement of the master member arrested as long as the actuating device is held in the operated position shown in Fig. 5 the closing of the blades being prevented by the abutment 26 engaging the shoulder 35 on the master member. Upon releasing the actuating device it will be returned to its normal position by the action of the spring 45, causing the projection 69 to be retracted and the master member released, which in turn releases the member 22 allowing the shutter blades to be closed.

In making a time exposure the master member is arrested by the conjoint operation of the time and bulb stop projections coöperating with their respective projections on the master member, when the guide 60 is moved inwardly by the engagement of the pin 8 with the cam step 83. Then the movement of the actuating device 38 sets the master member and moves the reciprocatory member 65 inwardly, to the position shown in Fig. 4, and when the master member is released it is first caught by the projection 69 and subsequently arrested by the stop 71 which is moved in front of the projection 72, prior to the disengagement of the projections 69 and 70. During this part of the operation the reciprocatory member 65 has been moved slightly in a direction toward its normal position by the action of the spring $38^a$, but in order to hold the shutter blades open for an indefinite length of time the complete return movement of the member 65 is prevented by a small shoulder 84, at the outer side of the stop 71, which engages with the side of the projection 72 to hold the parts as shown in Figs. 6 and 7, permitting the master member to be released only when the member 65 is again moved inwardly by a second or subsequent movement of the actuating device 38.

I claim as my invention:—

1. In a shutter, the combination with a casing, pivoted blades therein and a controller for operating them, of a master member for operating said controller, a stop adapted to coöperate with the master member and adjustable in a plane extending transversely of the path of said member, an actuating device coöperating with the master member and stop for setting the former in engagement with the controller and adjusting the stop into and out of coöperative relationship with the master member.

2. In a shutter, the combination with a casing, pivoted blades therein and a controller for operating them, of a master member for operating said controller, an actuating device for setting the master member in engagement with the controller and a stop reciprocated across the path of the master member by the actuating device and means for adjusting the stop laterally relatively to the plane of the movement of the master member.

3. In a shutter, the combination with a casing, pivoted blades therein and a controller for operating them, of a master member for operating said controller, an actuating device for moving the master member into engagement with the controller and a reciprocating stop adjustable into operative alinement with the master member and connections between the actuating device and said stop for projecting and retracting the latter into and out of engagement with the master member.

4. In a shutter, the combination with a casing, pivoted blades therein and means for operating them, of a master member controlling said means, a movable stop coöperating with the master member, means for adjusting said stop into operative alinement therewith and a setting device for said master member connected to the stop and actuating it into and out of engagement with the master member.

5. In a shutter, the combination with a casing, pivoted blades therein and means for operating them, of a master member controlling said means, an actuating device for the master member and a stop reciprocated thereby, a movable guide for the stop and means for adjusting it to move the stop into operative position relative the master member.

6. In a shutter, the combination with a casing, pivoted blades therein and means for operating them, of a master member controlling said means and having a projection thereon, an actuating device for the master member, a reciprocating stop adapted to engage the projection, a movable support for the stop normally holding it in an inoperative position and means for adjusting said support to move the stop into alinement with said projection.

7. In a shutter, the combination with a casing, pivoted blades therein and means for operating them, of a master member controlling said means and having a projection thereon, an actuating device for the master member, a guide arranged at one side of the master member and means for adjusting it relatively to the path of said member, a stop supported on the guide, means for projecting it into the path of the projection on the master member and means for retracting it out of engagement therewith.

8. In a shutter, the combination with a casing, pivoted blades therein and means for operating them, of a master member controlling said means and an actuating device for said member, a guide arranged over the master member and a yielding support for the guide, a stop carried on the guide, a device for adjusting the latter relatively to the master member and means for operating the stop into and out of engagement with said master member.

9. In a shutter, the combination with a casing, pivoted blades therein and means for operating them, of a master member controlling said means and an actuating device for said member, of an arm, an adjustable support therefor, and a guide on the arm, a movable stop on the guide, mechanism for adjusting the guide to place the stop in operative position relative the master member and connections between the actuating device and said stop for causing it to coöperate with the master member.

10. In a shutter, the combination with a casing, pivoted blades therein and means for operating them, of a master member controlling said means and an actuating device for said member, a movable guide having a cam surface thereon, a member carried on the casing and engaging the cam surface to move the guide relatively to the path of the master member, a stop on the guide and means for actuating it into and out of engagement with the master member.

11. In a shutter, the combination with a casing, pivoted blades therein and a member for operating them, a master member controlling its operation and an actuating device for the latter, of a movable guide, a sleeve journaled on the casing and coöperating with the guide to move it relatively to the path of the master member and a movable stop carried on the guide and coöperating with the master member.

12. In a shutter, the combination with a casing, pivoted blades therein and a member for operating them, a master member controlling its operation and an actuating device for the latter, of a movable guide, a tubular sleeve extending into the casing and journaled thereon and coöperating with the guide to move it relatively to the master member and a movable stop carried on the guide and coöperating with the master member.

13. In a shutter, the combination with a casing, pivoted blades therein and a member for operating them, a master member controlling its operation and an actuating device for the latter, of a movable guide, a tubular sleeve journaled in the casing and coöperating with the guide to move it relatively to the master member, a ring encircling the sleeve having an index pointer and a stop on the guide coöperating with the master member.

14. In a shutter, the combination with a casing, pivoted blades therein, a member for operating them, a master member for controlling its operation having two projections thereon and a device for actuating the master member, of a guide, a member movably mounted on the guide having stops adapted to separately engage said projections, means for adjusting the guide to move said stops into operative alinement with their respective projections and means for moving the member on the guide.

15. In a shutter, the combination with a casing, pivoted blades thereon, a member for operating them, a master member for controlling its operation having two projections thereon of different lengths and a device for actuating the master member, of a guide, a member movably mounted thereon having stops adapted to engage the separate projections, means for adjusting the guide to move one or the other of said stops into the plane of its respective projection and means for reciprocating the member on the guide.

16. In a shutter, the combination with a casing, pivoted blades therein, a member for operating them, a master member for controlling its operation having two projections thereon and a device for actuating the master member, of a guide, a reciprocating member mounted thereon having a stop adapted to engage one of the projections and provided with a second stop adapted to interlock with the other projection, means for adjusting the guide to carry one or the other of said stops into operative alinement with its respective projection on the master member and means for reciprocating the member on the guide.

17. In a shutter, the combination with a casing, pivoted blades therein, a member for operating them, a master member for controlling its operation having two projections thereon of different lengths and a device for actuating the master member, of a guide having a cam surface, a member movably mounted on the guide, stops on the member adapted to be moved into and out of engagement with the projections, a device engaging the cam to carry the stops into the plane of the movement of their respective projections and means for reciprocating the member on the guide.

18. In a shutter, the combination with a casing, pivoted blades therein, a member for operating them, a master member for controlling its operation having two projections thereon of different lengths and a device for actuating the master member, of a movable support, a reciprocatory member mounted thereon and means for operating it, a bulb stop on the member adapted to engage one of the projections and a time stop also carried on said member and adapted to coöperate with the other projections and a device engaging the support to set the bulb and time stops in coöperative relationship to their respective projections.

19. In a shutter, the combination with a casing, pivoted blades therein and a member for operating them, of a pivoted master member, coöperating with the operating member, means for adjusting one of said members to limit its dwell in engagement with the other member, a device for actuating the master member and means for closing the blades.

20. In a shutter, the combination with a casing, pivoted blades therein and a member for operating them, of a pivoted master member coöperating with the operating member to open the blades, means for adjusting the master member to limit its dwell in engagement with said operating member, a device for actuating the master member and means for closing the blades.

21. In a shutter, the combination with a casing, pivoted blades therein and an operating member therefor having a projection, of a master member having a shoulder coöperating with said projection, means for adjusting the master member to vary the distance through which the operating member is moved and a device for actuating the master member.

22. In a shutter, the combination with a casing, pivoted blades therein and an operating member therefor having a projection, of a pivoted master member provided with a shoulder coöperating with said projection, means for adjusting the pivotal point of the master member and means for actuating the latter.

23. In a shutter, the combination with a casing, pivoted blades therein and a pivoted operating member therefor, of a pivoted master member coöperating with the latter, means for adjusting the pivotal point of one of the members relatively to the said point of the other member, to vary the opening movement of said blades and an actuating device for the master member.

24. In a shutter, the combination with a casing, pivoted blades therein, an operating member therefor and a swinging arm, of a master member carried on the arm and coöperating with the operating member, means for adjusting the arm to vary the opening movement of the blades and a device for actuating the master member.

25. In a shutter, the combination with a casing, pivoted blades therein, an operating member therefor, and a swinging arm pivoted in the casing, of a master member pivoted on the arm and coöperating with the operating member, an index finger arranged exteriorly of the casing and connected to the arm for adjusting said master member to vary the movement of the operating master member, and an actuating device for the master member.

26. In a shutter, the combination with a casing, pivoted blades therein, an operating member therefor and a swinging arm, of a master member carried on the arm and cooperating with the operating member, a retarding device pivoted to the master member and the casing, means for adjusting the arm to vary the movement of the operating member and an actuating device for the master member.

27. In a shutter, the combination with a casing, pivoted blades therein, an operating member therefor and a swinging arm, of a master member carried on the arm and coöperating with the operating member, a retarding device embodying a cylinder and a movable piston pivotally connected to the master member and the casing, an index finger for adjusting the arm and an actuating device for the master member.

28. In a shutter, the combination with a casing, pivoted blades therein, an operating member therefor and a master member for controlling it, of a guide having a cam surface, a movable member thereon having a stop and a sleeve journaled on the casing and provided with a part engaging the cam surface, a device for actuating the master member and reciprocating the movable member, a swinging arm carrying the master member and an index finger journaled on the sleeve and connected to the swinging arm.

29. In a shutter, the combination with a casing having recesses or apertures therein and pivoted blades, of an operative member, projections thereon engaging the blades and extending into the recesses or apertures and means for operating the member.

30. In a shutter, the combination with a casing having a support therein provided with a plurality of recesses formed concentrically, and a plurality of pivoted blades, of an oscillatory operating member, projections thereon extending through the blades and engaging the sides of the recesses to center the member and means for operating the latter.

31. In a shutter, the combination with a support, stationary shoulders thereon and blades having ends lying between the shoulders and forming pivots for the blades, of an operating member extending over the blades within the shoulders, connections between the member and the blades and means for actuating the operating member.

32. In a shutter, the combination with a support, a stationary ring thereon having recesses opening at its inner edge and blades having ends extending into the recesses, of an operating member located within the ring and coöperating with the blades and means for actuating the operating member.

33. In a shutter, the combination with a support provided with concentric recesses or apertures therein and pivoted blades, of an oscillatory member, projections thereon engaging the blades and entering the recesses to center the member and coöperating with the ends thereof to limit its movement and means for operating the member.

34. In a shutter, the combination with a support, shoulders thereon and thin blades having an extended portion provided with upturned edges located between adjacent shoulders, of a member engaging the blades and means for operating said member.

35. In a shutter, the combination with a casing having a bottom provided with concentric apertures, a ring on the bottom provided with recesses, and blades lying on the bottom and having portions extending into the recesses on the ring, of an operating member extending over the leaves and located within the ring, retaining devices engaging the member, projections on the latter engaging the leaves and extending into the recesses in the bottom of the casing to center the operating member and means for actuating the member.

36. In a shutter, the combination with a casing, pivoted blades therein and means for operating them, of a master member controlling said means, a setting device for the master member, a stop actuated by the setting device across the path of the master member and means for adjusting said stop into operative alinement with said member.

37. In a shutter, the combination with a casing having a central aperture and a plurality of overlapping blades normally closing said aperture and having their outer ends projecting radially, of stationary shoulders forming abutments against which the opposite sides of said ends engage and means for oscillating the blades.

FRANK A. BROWNELL.

Witnesses:
   G. WILLARD RICH,
   RUSSELL B. GRIFFITH.